United States Patent Office 2,981,229
Patented Apr. 25, 1961

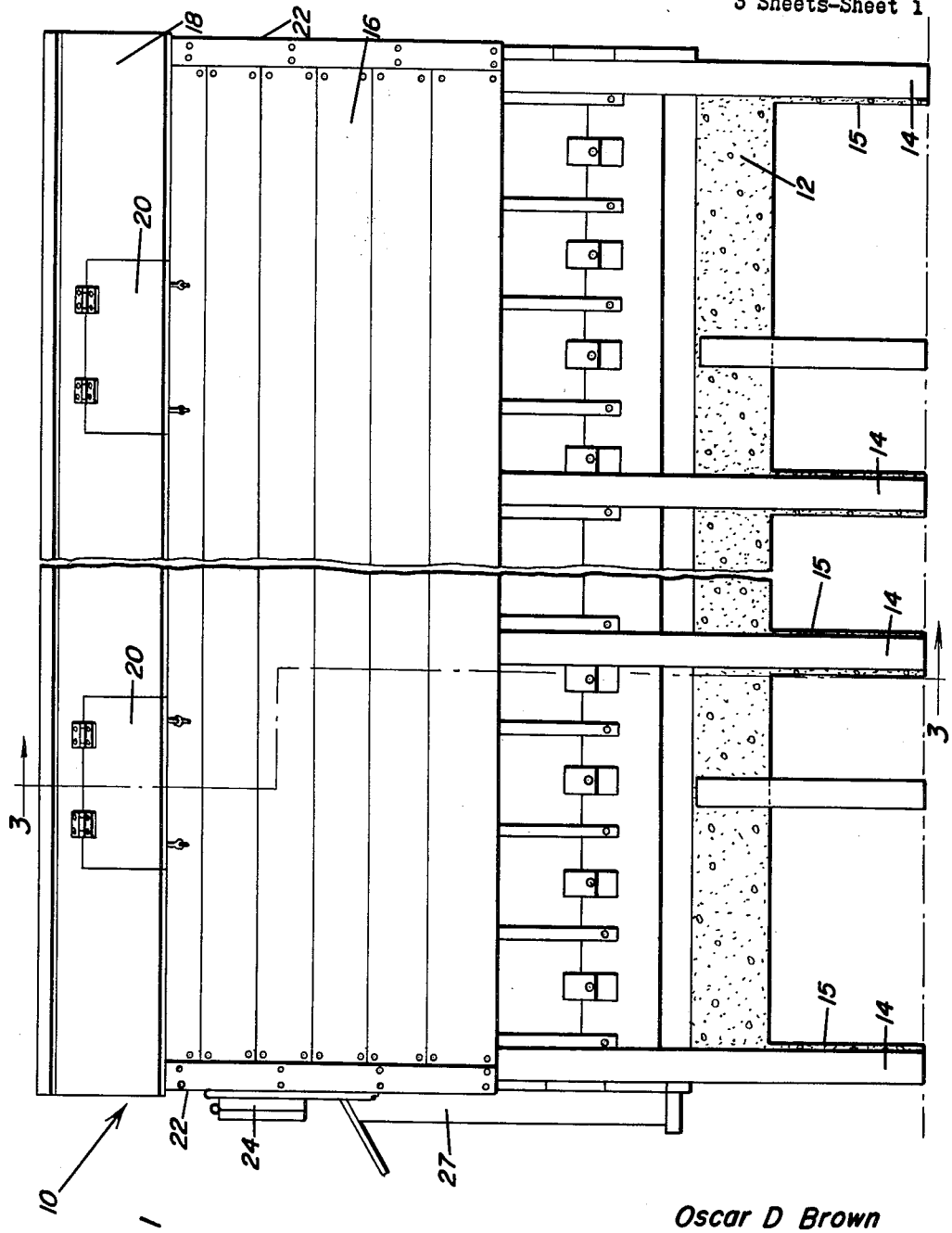

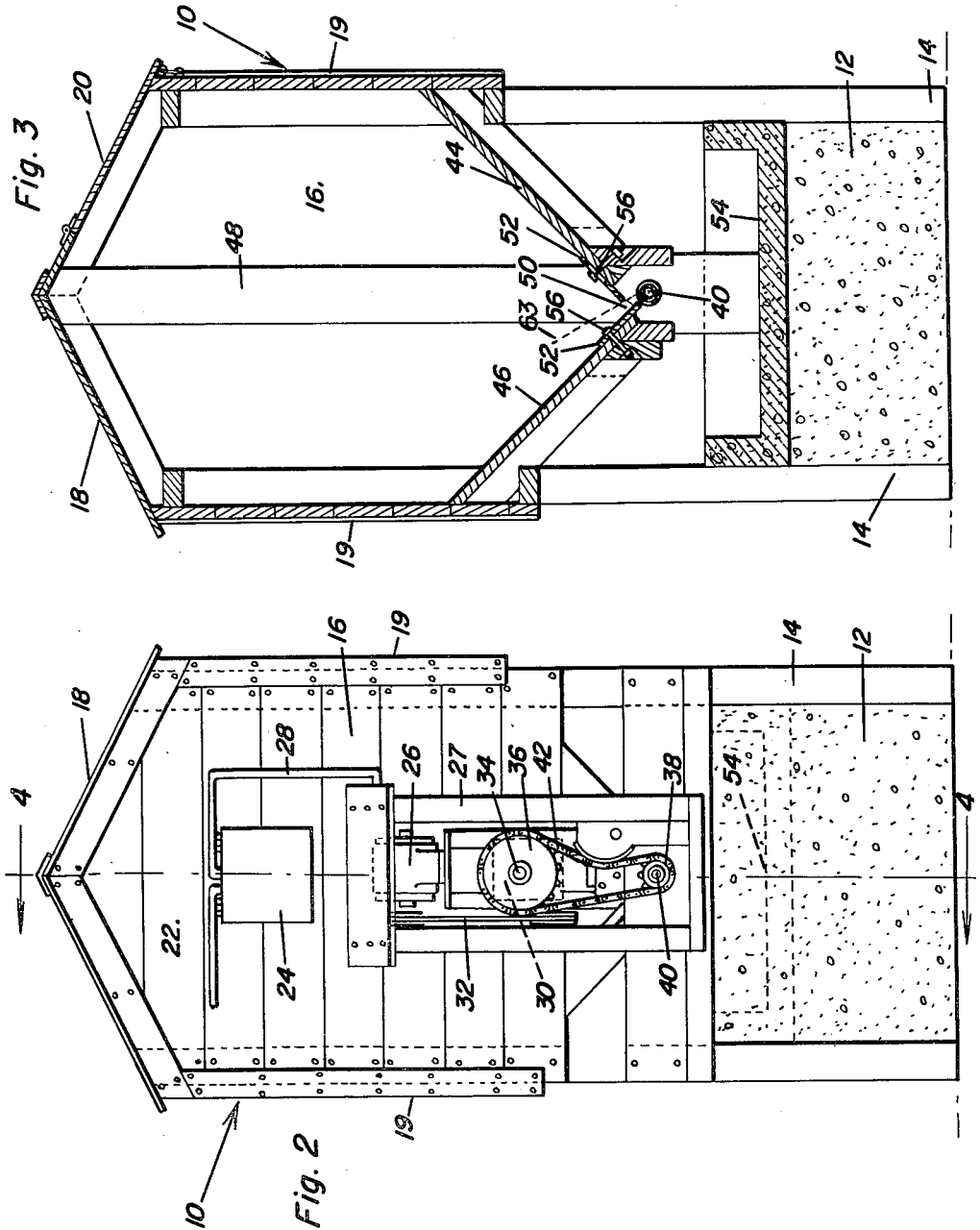

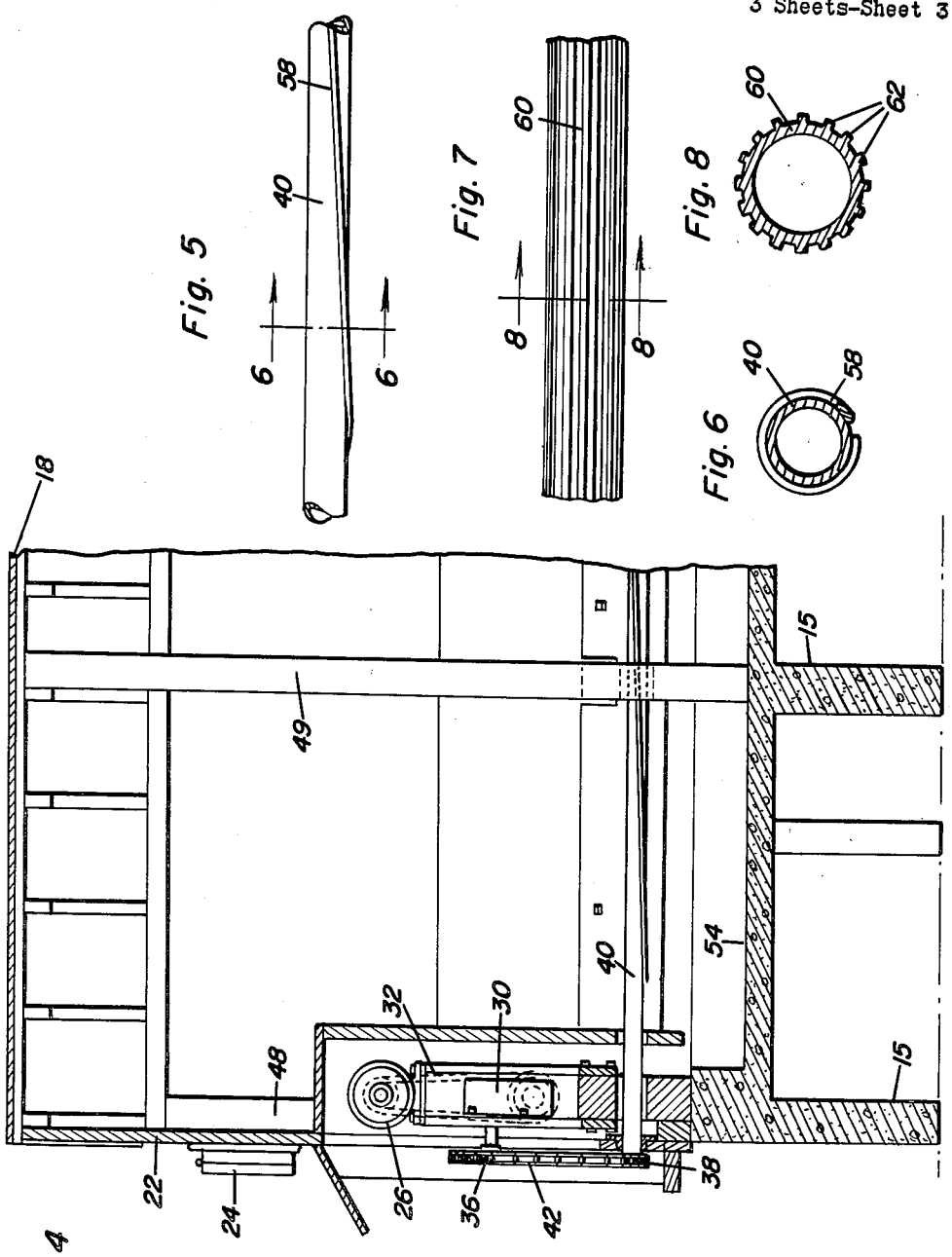

2,981,229

TIME CONTROLLED FEED BUNKER

Oscar D. Brown, 2829 N. Broad St., Fremont, Nebr.

Filed Jan. 20, 1959, Ser. No. 787,951

4 Claims. (Cl. 119—56)

This invention relates to a novel and useful device for feeding livestock and more particularly relates to an automatic time controlled feed bunker for supplying a predetermined quantity of feed from a storage hopper to a feeding trough at predetermined intervals.

The primary object of this invention is to provide a feed bunker in which large amounts of feed may be stored and one which will, at predetermined intervals, automatically discharge a desired quantity of feed into a feeding trough disposed below the storage bunker.

An important object of this invention is to provide a feed bunker which is automatic and which will deliver feed along the entire length of an elongated feeding trough.

Another important object of this invention is to provide an automatic time controlled feed bunker which will, because of its construction, enable livestock to reach the feed which has been discharged from the hopper from both sides of the feeding trough.

Yet another important object is to provide an automatic time controlled feed bunker which will automatically discharge the desired quantity of feed into a feeding trough at a predetermined time, and one in which the duration of the discharging operation and the length of the time between the feedings may be readily adjusted as to the present needs.

A further object is to provide a device in accordance with the preceding objects which will be easy to maintain, and one which has a minimum of moving parts thereby eliminating most of the constant attention which is usually given to farm machinery.

A still further object in accordance with the preceding objects, is to provide an automatic time controlled feed bunker having a delivery chute with a throat or delivery opening therein which is adjustable so that feed positioned within the throat will form an angle of repose which will maintain the feed within the bunker not allowing it to flow over the delivery shaft or sift past the delivery mechanism into a feeding trough when the feed bunker is inoperative.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention shown with a section of the mid-portion thereof broken away;

Figure 2 is an end elevational view of the invention showing the left side of the construction shown in Figure 1;

Figure 3 is a vertical transverse sectional view of the invention taken substantially upon the plane indicated by the section line 3—3 of Figure 1;

Figure 4 is a longitudinal vertical sectional view taken substantially upon the plane indicated by the section line 4—4 of Figure 2, with parts being broken away and showing the manner in which the motor is drivingly connected to the delivery shaft;

Figure 5 is an enlarged detail view showing in elevation a portion of one form of delivery shaft incorporated in the invention;

Figure 6 is a vertical transverse sectional view taken upon an enlarged scale substantially upon the plane indicated by the section line 6—6 of Figure 5;

Figure 7 is an enlarged detail view showing in elevation a modified form of the delivery shaft used in connection with the invention; and Figure 8 is a vertical transverse sectional view of the modified form of the delivery shaft taken upon an enlarged scale substantially upon the plane indicated by section line 8—8 of Figure 7.

Referring now more specifically to the drawings, the numeral 10 generally designates the feed bunker comprising a base 12 constructed of cement or other suitable material which has supports 14 and 15 that support the storage portion 16 and the base 12 respectively of the bunker 10. There is provided a roof 18, end walls 22, and side walls 19 insuring that the feed contained within the bunker will be protected from the elements with openings (not shown) therein through which the feed bunker may be filled. Hinged doors 20 are provided as closures for the openings.

With attention drawn now to Figure 2, mounted upon an end wall 22 of the feed bunker 10 is a clock mechanism 24 which may include two separate clocks (not shown) which are used to control the time interval between the feedings, and to control the duration of each discharge of feed at each feeding.

It is to be understood that any desired type of timing mechanism may be used, especially one which will enable the amount of feed discharge, by controlling the duration of the discharge, to be regulated irrespective of the timed interval between the feedings. It is also to be understood that when the feed bunker is to be used in connection with livestock of the type that mature quite rapidly in size, that the time clocks may be of the type which would enable progressively longer periods of feed discharge at each feeding so that the feed bunker would be able to compensate automatically for the growth and thus the increased feed requirement of that particular type of livestock.

Running from the clock mechanism 24 to a motor 26 is an electrical conduit 28 which supplies the required amount of electricity to the motor 26 at the desired intervals for discharging the required amount of feed. The motor 26 is received in a compartment or housing 27 in the end wall 22 and is drivingly connected to a gear reduction box 30 by an endless belt 32. Secured to the output shaft 34 of the rear reduction box 30 is a sprocket gear 36 which is drivingly connected to a second sprocket gear 38 which is connected to one end of the delivery shaft 40 by means of endless chains 42.

With attention drawn now more particularly to Figure 3 of the drawings, the storage portion 16 is shown having two downwardly directed but convergent bottom wall members 44 and 46 which are appropriately braced and supported and whose lower edges lie in overlying relation above the delivery shaft 40 which is journalled in the end walls of the bunker in the end posts 48 thereof and at points intermediate the ends thereof through center supports 49 if desired. The bottom wall members 44 and 46 form a V-shaped chute which extends the entire length of the feed bunker 10 with an opening as shown at 50 between the overlying ends of the bottom surfaces. Steel plates 52 are adjustably secured to the overlying ends of the upper surfaces of the bottom wall members 44 and 46 whereby the lower ends of the bottom members may be adjusted in spaced relation to vary the opening of the throat 50. The angle of repose 63, see Figure 3, formed by the various types of feed being dispensed from the feed bunker through the throat 50 and lying upon the delivery shaft 40 while the latter is inoperative, may be controlled by plates 52 upon the adjustment thereof, so that the feed, while at rest, will not be allowed to sift or fall directly into the feeding trough 54 which is disposed immediately therebelow and contained within the base 12. Steel plates 52 are adjustably secured to bottom members 44 and 46 by means of bolts 56 which are mounted in transversely extending slots (not shown) formed in plates 52 at spaced intervals along the longitudinal length thereof.

The delivery shaft 40 is shown in the drawings, see Figures 5-8, in two modified forms. The first form is a hollow pipe or shaft that has a quarter round steel rib 58, or other suitable material welded in a spiral manner along substantially the entire length of the shaft which is enclosed within the feed bunker 10. The quarter round 58 is welded or attached to the delivery shaft 40 to prevent the caking or clogging of meal or other fine feeds within the opening 50. A modified form of the delivery shaft is shown in Figures 7 and 8 and is in the form of a hollow spined shaft 60 whose projections 62 serve the same purpose as the quarter round 58.

In operation, the feed bunker 10 is first filled through doors 20 with the desired feed and the plates 52 are adjusted to create the desired width of the throat 50 whereby the angle of repose 63 of the feed at rest, see Figure 3, will prevent spilling of the feed off of the shaft 40 and then the clock mechanism is set to actuate the motor 26 at the desired intervals and for the desired duration.

It is to be noted that once the quantity of food has been placed within the bunker, that the bunker will operate in the manner for which it was designed with very little maintenance and requiring only a source of electricity for power.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A time controlled feed bunker comprising a base, said base including a feeding trough, a storage portion disposed above said base, said storage portion having side and end walls and downwardly directed and inwardly convergent longitudinally extending bottom walls each having a plate mounted thereon whose lower edge extends below the lower edge of the corresponding bottom wall, the lower edges of said plates being spaced apart and defining an opening therebetween, a longitudinally extending generally cylindrical delivery shaft mounted in said bunker for rotation about a horizontal axis disposed below and extending the entire length of said opening, operating means connected to said shaft for effecting rotation thereof, said plates lying in planes intersecting each other along a line generally paralleling, above and to one side of the axis of rotation of said shaft and spaced outwardly of the outermost surfaces of said shaft, the plane containing one of said plates passing through said shaft below the upper surface thereof and the plane containing the other plate passing through said one plate, the lower edge of said one plate disposed immediately adjacent the outermost surfaces of said shaft and means mounting at least said other plate for adjustable movement toward and away from said opening whereby one longitudinal edge of said opening may be adjusted in order that feed disposed in said opening and resting on said one plate and the upper surfaces of said shaft may have its angle of repose adjusted to lie on a chord of said shaft whereby feed will be dispensed from said bunker only upon rotation of said shaft.

2. The combination of claim 1 including a plurality of transversely extending parallel slots formed in said other plate, said securing means including adjustable fasteners carried by the corresponding bottom wall and received through said slots.

3. The combination of claim 1 including adjustable timing means operatively connected to said operating means determining the time and the duration of the operation of said operating means.

4. The combination of claim 1 wherein said delivery shaft has at least one longitudinally extending radial projection thereon.

References Cited in the file of this patent

UNITED STATES PATENTS

| 863,071 | Kirstein | Aug. 13, 1907 |
| 2,640,464 | Jindrich | June 2, 1953 |
| 2,669,218 | Erickson | Feb. 16, 1954 |
| 2,782,760 | Wolfe | Feb. 26, 1957 |

FOREIGN PATENTS

| 37,258 | Denmark | Mar. 8, 1927 |